United States Patent [19]

Masserang

[11] Patent Number: 4,675,971
[45] Date of Patent: Jun. 30, 1987

[54] DESICCANT ASSEMBLY FOR REFRIGERATION CIRCUIT AND METHOD

[75] Inventor: Gregory J. Masserang, Clarkston, Mich.

[73] Assignee: Michigan Special Products, Inc., Oxford, Mass.

[21] Appl. No.: 804,401

[22] Filed: Dec. 3, 1985

[51] Int. Cl.[4] ............................................. B23P 17/00
[52] U.S. Cl. .................................. 29/422; 29/157 T; 29/455 R; 62/503; 210/DIG. 6
[58] Field of Search ............... 413/1, 4; 210/689, D6, 210/D7; 29/422, 157 T, 455 R; 228/60, 112, 184; 62/474, 475, 503

[56] References Cited

U.S. PATENT DOCUMENTS

| | | | |
|---|---|---|---|
| 2,410,813 | 11/1946 | Dillon | 228/112 |
| 2,659,128 | 11/1953 | Baldwin et al. | 29/422 |
| 4,291,548 | 9/1981 | Livesay | 210/D6 |
| 4,436,623 | 3/1984 | Cullen et al. | 210/D6 |

Primary Examiner—Frederick R. Schmidt
Assistant Examiner—Robert Showalter
Attorney, Agent, or Firm—Krass & Young

[57] ABSTRACT

A method of manufacturing a desiccant assembly for a refrigeration circuit of the type used in automotive air conditioning systems. The method includes performing a container body by cutting a piece of seamless tube stock and friction forming one end of the tube to form an end wall. One or more apertures are formed within the container body to accommodate refrigerant circuit fittings. A refrigerant tube is installed in the container body along with associated components such as the desiccant material, additional fittings etc. Thereafter, the container body is again friction formed to enclose the opposite end wall of the container. The method according to this invention avoids the disadvantages associated with a multi-piece desiccant container which is subject to refrigerant leakage.

12 Claims, 14 Drawing Figures

DESICCANT ASSEMBLY FOR REFRIGERATION CIRCUIT AND METHOD

BACKGROUND AND SUMMARY OF THE INVENTION

This invention relates generally to a refrigeration circuit through which a refrigerant is circulated. A typical circuit comprises a compressor, an evaporator, an expansion valve, and a condenser as principal components, and an example of such a circuit is contained in an automobile air conditioning system. Such a system also comprises a desiccant assembly in the circuit to perform a desiccant function on the refrigerant. More specifically, this invention relates to a new and unique desiccant assembly and method.

In a typical refrigeration circuit, such as the type commonly used in automobile air conditioning systems, refrigerant is circulated through the circuit to produce cooling. The energy input to the circuit is via the compressor which is driven from the automobile's engine and which serves to create a source of pressurized liquid refrigerant which is allowed to expand through the expansion valve into the evaporator. In the evaporator the expanding refrigerant absorbs heat thereby producing cooling of a medium which is in heat transfer relationship with the evaporator. In an automobile air conditioning system that medium is air. From the evaporator the refrigerant passes to a condenser where the heat absorbed in the evaporator is rejected. The heat rejection is to the outside environment in the described automobile air conditioning usage. The refrigerant is then drawn from the condenser by the compressor where it is again compressed and the cycle repeated.

It has been found desirable for the circuit to have a desiccant which acts on the refrigerant, basically for the purpose of collecting entrained moisture which may have been introduced into the refrigeration circuit for any of a number of possible reasons. In other words, the desiccant serves to prevent moisture from circulating through the circuit where its presence might give rise to undesired consequences.

Since the refrigeration circuit is a closed one, it is vital for the desiccant to be in an operative relationship with the refrigerant in a manner which maintains the closed nature of the circuit. The prevailing practice is for the desiccant to be contained in a desiccant assembly which comprises a cylindrical container having an inlet and an outlet for connecting it into the circuit. The desiccant is itself located within the container, and is typically contained in a bag which fits into the bottom of the cylindrical container. The construction of the container is such that refrigerant flow is directed through the desiccant so that the latter can perform its intended function of removing moisture from the refrigerant.

The prevailing practice in the fabrication of such desiccant assemblies comprises the container being formed of two separate parts, such two half shells or a base and a cap, joined together around a circular seam. The two parts are typically drawn or stamped. The various component parts of the desiccant assembly are assembled into the two container parts before the latter are seamed together.

This known process for fabricating the desiccant assembly has therefore comprised operations performed on two separate container parts, a subsequent assembly of various parts, and finally a joining of the two container parts together, such as by brazing in the case of aluminum or aluminum alloy, or by welding in the case of steel. The presence of the seam is a potential source for leakage, and from a practical manufacturing standpoint in mass production, reliability of this type of process has been shown to be poor. Significant reject and scrap rates have been tolerated as being a necessary consequence of the known manufacturing procedures. Even though a seam may visually appear satisfactory, there can be minute pin holes which form leak paths. The effectiveness of seaming procedures can be impaired because of the residual presence of materials used to facilitate the formation of one or both of the two container parts, i.e. the residual presence of lubricants or drawing compounds for instance when the parts are drawn or extruded.

The present invention is directed to a new and improved desiccant assembly which avoids the disadvantages associated with the prior manufacture of desiccant assemblies as just described. An important attribute of the invention is that it can significantly reduce the reject and scrap rates in the mass production of such desiccant assemblies. Moreover it is of a more efficient construction since it uses a single part to form the desiccant container rather than two separate parts seamed together.

The invention involves the application of friction spinning to the ends of seamless tube stock to form closed endwalls whereby the container comprises a single unitary body having a sidewall and integral endwalls. With the invention the continuous seam which was required in the prior manufacture is eliminated. The invention also involves the fabrication of various components and their subassembly to the one piece container at various stages of the fabrication process. Hence, related aspects of the invention involve the method of assembly.

The invention is adaptable to various packaging and geometrical configurations. In an automobile usage where the desiccant assembly may be located in the engine compartment, it is often necessary for the assembly to be in a limited space and for the inlet and outlet to be in particular geometric relationship to the container so that refrigerant lines can be connected to them. The invention is advantageously useful with different configurations, such as an external tube version and an internal tube version, examples of both of which will be subsequently hereinafter described.

In application of the invention to automobile air conditioning systems, important benefits accrue. The preferred embodiment of the present invention utilizes light-weight material which is consistent with the efforts of the automobile industry to make weight savings and fuel economy gains. It is also a better finished product suited to the quality improvement effort of the industry than is the prior multi-piece body construction.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 6:
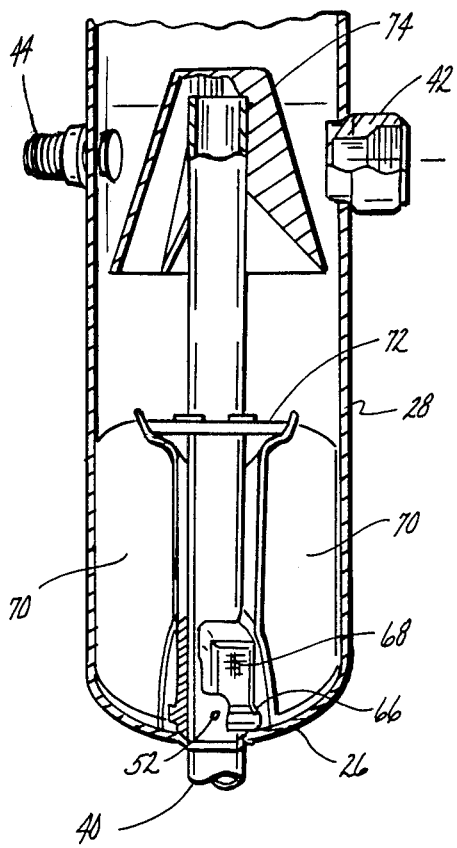
FIG. 6 is a view similar to FIG. 4, but after the performance of subsequent fabrication steps.
Figure 7:
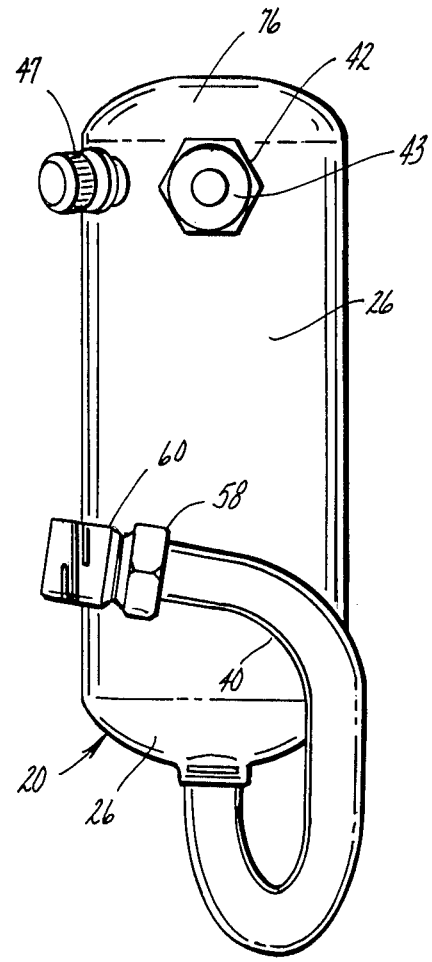
FIG. 7 is a view similar to FIG. 6 after the performance of the final fabrication step, and therefore shows the completed desiccant assembly. This view is taken at 90° to FIG. 6.
Figure 8:
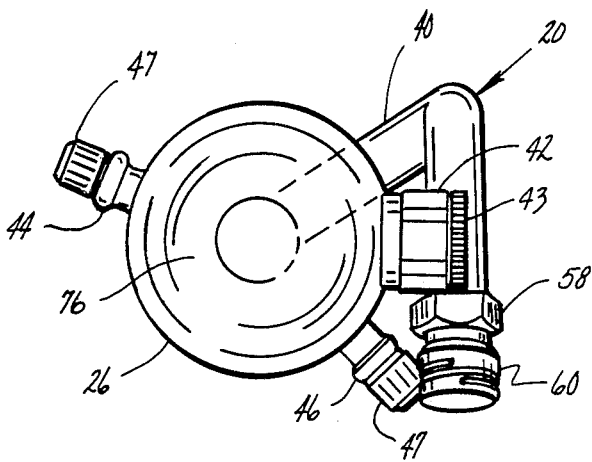
FIG. 8 is a top plan view of FIG. 7 rotated 90°.

FIGS. 1-9 relate to the fabrication of a desiccant assembly 20 which is shown in its finished form in FIGS. 7 and 8.

Figure 1:
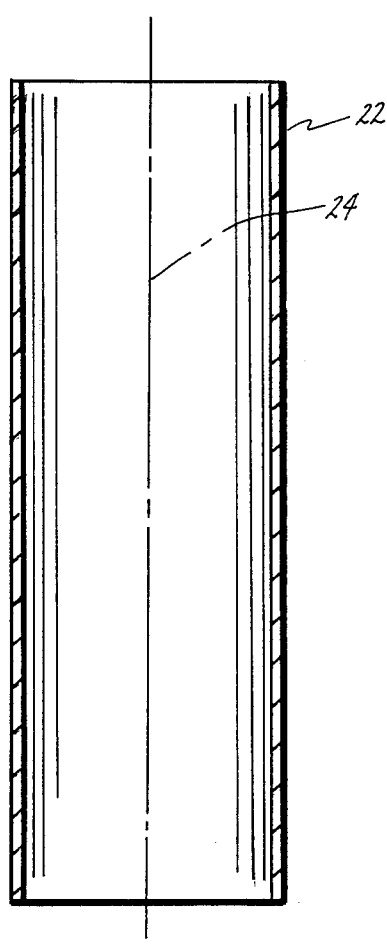
FIG. 1 is a longitudinal sectional view through a component used in the desiccant assembly of the present invention at a beginning stage of its fabrication process.

Referring first to FIG. 1 a piece of circular walled, seamless tube stock 22 is cut to a length appropriate to the final finished dimension for the desiccant assembly's body. The tube stock 22 will ultimately form a one-piece body in the finished assembly. The ends of the tube stock are shown to be cut at right angles to the main axis 24. The preferred material is aluminum or an aluminum alloy. This is represented by the step 100 in FIG. 9, and it is followed by a de-greasing step 101.

Figure 2:
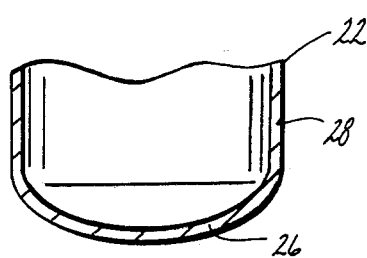
FIG. 2 is a fragmentary view of a portion of FIG. 1 after the performance of a further particular fabrication step.
Figure 5:
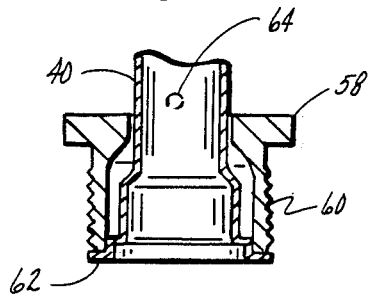
FIG. 5 is a fragmentary view taken generally within circle 5 of FIG. 4 but in an enlarged section and including a further fabrication step.

A friction spinning operation is then conducted on one end of the tube stock 22 for the purpose of forming an integral end wall. This result is shown in FIG. 2 which depicts the finished end wall 26 which is integral with the side wall 28. FIG. 2 shows the end wall fully closed. This step is designated 102 in FIG. 9.

The friction spinning process is conducted using conventional friction spinning procedures. The initial cut length of the tube stock 22 is greater than the finished length of the one piece body so as to take into account end wall formation by friction spinning.

A typical spinning procedure comprises the tube stock being chucked on the spindle of a spinning machine (not shown) and spun about axis 24 at a suitable speed. A suitable tool such as a spinning wheel is operated to engage the end of the spinning tube stock to displace it radially inwardly to form the integral end wall 24. The end wall may have a shape which progressively increases in thickness in the radially inward direction.

During the friction spinning operation the spinning rate and the feed of the spinning wheel which is used to close the end of the tube may be set in such a way that the central region of the end wall outer surface actually becomes molten. This procedure promotes a superior closure of the end wall.

The result can be beneficial from the standpoint of efficient use of material because a circular cylindrical walled vessel has inherent hoop strength in the circumferential direction around its sidewall. Thus from the standpoint of structural considerations the sidewall can be of a lesser thickness than the end wall and that is a construction which can be achieved through the use of the friction spinning procedure.

Figure 3:
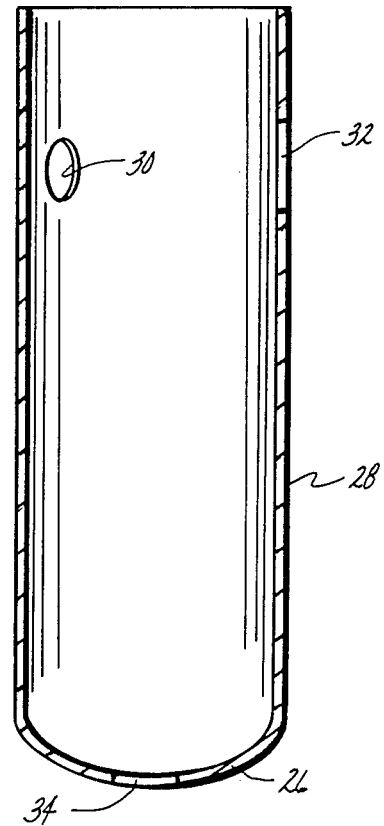
FIG. 3 is a view similar to FIG. 1 illustrating the completion of still further fabrication steps.

The next step (FIG. 3) involves the creation of certain holes, with the particular version which is the subject of FIGS. 1 through 8 having three holes in its sidewall spaced from the open top thereof and a fourth hole in the integral end wall 26. Only two of the three holes in the sidewall appear in FIG. 3 since the remaining hole is in the portion that has been sectioned away. The three holes which do appear in FIG. 3 are identified by the reference numerals 30, 32, and 34. The holes are utilized for the attachment of additional component parts to the one piece unitary body formed from tube stock 22. The two holes 30 and 32 are concentric to radials from axis 24 while hole 34 is concentric with axis 24.

Since the tube stock 22 has a circular cylindrical wall, it may be appropriate to coin the stock material around the margins of the sidewall holes so that each of the holes is disposed in a flat plane rather than on a circularly curved surface corresponding to the radius of curvature of the sidewall.

It was previously mentioned that end wall 26 was formed to be fully closed. Where a hole, such as the hole 34, is to be provided in the integral end wall it is possible that the friction spinning procedure could produce a substantially closed but not a fully closed end wall since a hole is to be provided in the end wall in any event. This however will depend upon the particular procedure.

Figure 9:
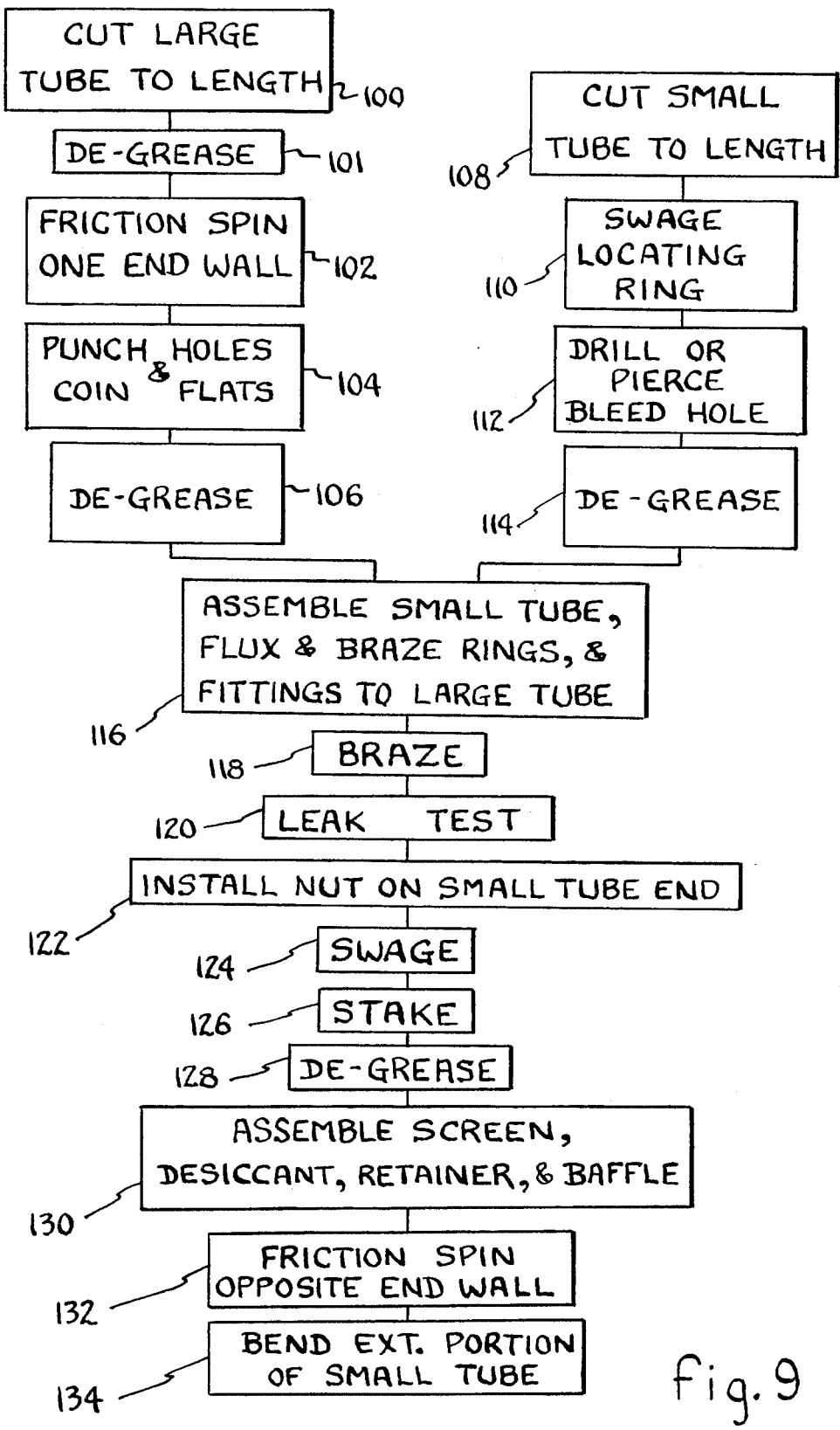
FIG. 9 is a block diagram useful in explaining a preferred sequence of fabrication steps relating to the preceeding FIGS. 1-8.
Figure 10:
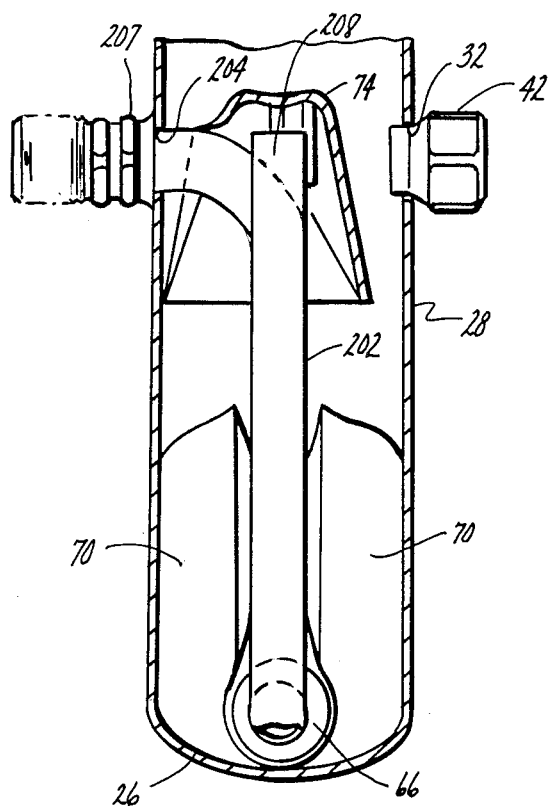
FIG. 10 is a longitudinal sectional view illustrating a second version of desiccant assembly embodying principles of the invention.

These steps of punching the holes and coining whatever flat areas may be required are represented by the step 104 in FIG. 9, although the drawings do not specifically show any coined areas.

With the tube stock in the stage of fabrication represented by FIG. 3, it is ready for subsequent brazing operations to attach additional components which are also aluminum or aluminum alloy. In order to assure optimum brazing it is desirable to perform a de-greasing operation to remove undesirable contaminants from the metal, and this de-greasing step is represented by the reference numeral 106 in FIG. 9.

Figure 4:
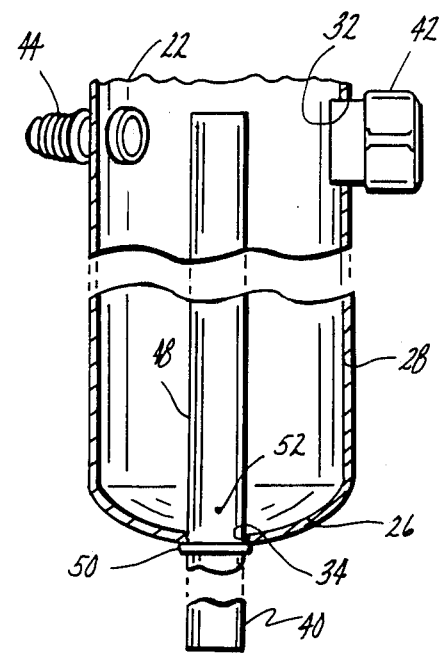
FIG. 4 is a view similar to FIG. 1 illustrating an intermediate stage of the fabrication process subsequent to FIGS. 2 and 3.

FIG. 4 shows a further stage of the fabrication process where additional components have been assembled. These additional components are a tube, generally 40, an inlet fitting 42, and a pair of valve core fittings 44 and 46, fitting 46 not appearing in FIG. 4.

Tube 40 fits into hole 34, fitting 42 fits into hole 32, and fitting 44 fits into hole 30. The remaining valve core fitting 46 has a fit with the hole which is not shown in FIG. 3; however the two valve core fittings and the two holes with which they fit are identical, and they are located generally diametrically opposite each other on sidewall 28.

The tube 40 is fabricated into the form illustrated in FIG. 4 prior to its being fitted into hole 34. The fabrication steps for tube assembly 40 are represented by the reference numerals 108, 110, 112 and 114 in FIG. 9.

The steps involve cutting tube stock 48 to an appropriate length (step 108) and then swaging a locating ring 50 at an appropriate location (step 110) so that when the tube is inserted into hole 34 the locating ring serves to limit the extent to which the tube is inserted, and thereby correctly locate the tube. In addition to the step of swaging the locating ring onto the tube, one or more very small bleed holes 52 are either pierced or drilled (step 112) through the sidewall of the tube so that they will be located within the interior of the one-piece container body in the finished desiccant assembly. With the small tube having been processed through the steps 108, 110, and 112, it is now ready for the brazing operation, and it is therefore appropriate to degrease the tube 40 (step 114) depicted in FIG. 9.

In accordance with conventional brazing procedures, flux and braze rings are first fitted onto the several fittings and the small tube where each of these component parts is fitted into the corresponding hole in the main body. This step is represented by the reference numeral 116 in FIG. 9. With the various components having been so assembled according to step 116, the brazing operation 118 is next conducted whereby the fittings and tube are joined to the partially formed main body by leak-proof joints.

In order to assure the successful completion of the brazing operation it is desirable to conduct a leakage test, on the joined parts in the condition represented by FIG. 4 (step 120). The leak test serves to prove the leak-proof joints of the locations of brazing. Thus after the performance of the leak test, the partially completed assembly has the form represented in FIG. 4.

Since the small tube 40 is intended to form the outlet connection of the desiccant assembly, a suitable means of connection is next created. This includes the steps of installing a nut 58 onto the exposed end of tube 40 (step 122), swaging the end of the tube at 62 to retain the nut thereon (step 124), moving the nut into engagement with the swage and then staking (numeral 64) the nut in place (step 126). It is to be appreciated that both the inlet fitting 42 and the outlet connection are suitably constructed so that when connections are made of the completed desiccant assembly into a refrigeration circuit, the connections form leakproof joints through which refrigerant is conducted into and out of the assembly. At this point a further de-greasing step 128 is performed.

The next steps in the fabrication process are described with reference to FIG. 6. An annular screen assembly 66 is inserted via the open end of the container onto tube 40. Screen assembly 66 has an ID which allows it to fit closely around tube 40 and to be disposed against the inside of end wall 26. FIG. 6 shows the final installed position of the screen assembly.

The screen assembly comprises a frame containing mesh screen elements 68, and the purpose of the screen assembly is to screen any contaminating material which may be in the system from potentially plugging the bleed orifice or orifices 52.

Next the desiccant element 70 is inserted into the container via the open end thereof. The illustrated configuration for the desiccant element comprises molecular sieve desiccant firmly contained in a polyester felt bag which fits with substantial conformity to the annular internal space surrounding tube 40 and screen assembly 66. FIG. 6 also shows the use of a retainer 72 which is associated with the desiccant bag to assist in holding the shape and placement.

The last element to be assembled into the container via the open end thereof is a baffle 74 which fits onto the upper end of tube 40. The purpose of the baffle is to shroud, but not block, the open upper end of tube 40 in the manner shown whereby fluid flow entering the inlet fitting 42 is caused to pass downwardly along the inside of the sidewall of the container and through the desiccant.

With the components 66, 70, 72 and 74 having been assembled into the open end of the container, as represented by 130 in FIG. 9, the next operation performed comprises friction spinning the open upper end of the sidewall of the tube stock to form the fully closed end wall 76 (step 132). Preferably end wall 76 is formed in the manner described earlier so that the best possible degree of closure is obtained. Because the components assembled to the container prior to spin forming of end wall 76 are substantially symmetrical about axis 24, the assembly can be suitably chucked on the spindle of a friction spinning machine and rotated with minimum imbalance. The fittings 42, 44, 46 are spaced from end wall 76 so as not to interfere with the friction spinning process forming that end wall.

FIGS. 7 and 8 illustrate the finished form of the desiccant assembly, and it can be seen that the tube 40 has been externally bent into a particular configuration subsequent to friction spinning of end wall 76. This is represented by the step 134 in FIG. 9. Consequently the completed assembly has been adapted for use in a particular installation so that connection of refrigerant lines to the inlet and outlet fittings can be conveniently performed. Although not shown, suitable provisions may be associated with the assembly for mounting it, such as through use of a bracket in the engine compartment of an automobile for air conditioning system usage.

Additional finishing procedures include the assembly of valves (not shown) into the fittings 44 and 46. Protective caps 43, 47, 60 are put over the various fittings until such time as the desiccant assembly is installed in a system, at which time these protective caps are removed.

Based upon the foregoing description it can be seen that the resulting construction has the container of a one piece unitary construction. There is no seam between two separate container parts as in the prior art. The invention provides significant improvements in fabrication and in reliability making the invention of meaningful cost-effectiveness. The illustrated embodiment 20 is referred to as an external tube version because a portion of tube 40 extends from the exterior as shown in FIGS. 7 and 8. It is possible to practice principles of the invention in an internal tube version and an example of such a version is described with reference to FIGS. 10-14.

The version 200 of FIGS. 10-14 comprises many of the same basic parts as the external tube version 20 and like reference numerals are used to identify these parts even though there may be some minor differences in appearance. A detailed description will therefore not be repeated.

One principal difference in the embodiment of FIGS. 10-14 is that the tube 202 is contained essentially entirely internally of the container. The tube is shown by itself in FIG. 13, and its shape can be perceived from that Figure and FIG. 10. The tube has a U-shaped bend at the bottom. The bleed hole 52 is provided at that bend and enveloped by the screen assembly 66. The version 200 enables the desiccant element 70 to be trapped by the tube itself so that a separate retainer structure may be omitted. The steps involved in the method are described with reference to FIG. 14.

The initial steps 300, 301, 302 in forming the main body are the same as described for the first version, namely cutting tube stock to length, de-greasing, and then friction spinning one end of the cut length of tube stock to form end wall 26 and sidewall 28. In this instance the end wall is fully closed and it remains so.

The small tube 202 is formed by conventional forming techniques into the illustrated configuration in a series of steps. These include cutting small tube stock to length (step 292), bending the cut tube into the desired curved shape (step 294), drilling or piercing the bleed hole, or holes (step 296), and de-greasing (step 298).

After the performance of step 302 on the large tube stock to form the one end wall 26, the step 304 of punching holes and coining flats is performed. The internal tube version 200 which has been illustrated does not use any end wall holes, but rather retains the three sidewall holes previously described for the external tube version 20 and includes a fourth hole 204 in the sidewall diametrically opposite hole 32 for a further fitting 207 to provide for the outlet connection. After step 304, a de-greasing step 306 is performed.

This is followed by assembling the fittings, flux and braze rings onto the body (step 308) and then brazing (step 310) whereby the various fittings 42, 44, 46, 207 are joined to the container body in a leakproof manner. Next a leak test is performed (step 312) to check the braze.

After performance of step 312, the desiccant element 70, and the formed tube 202, including screen 66 installed thereon, are assembled into the interior of the container via the open end thereof (step 314). The desiccant assembly is first inserted followed by the tube 202. The U-shaped bend of the tube fits between what may be considered as two halves of the desiccant bag, and in the final assembled position shown in FIG. 10, the tube holds the bag in place at the bottom of the inside of the container.

The shape of the tube is such that it can be manipulated so that the outlet end 206 can pass through hole 204 and be swaged into fitting 207. In the final position the inlet end 208 is disposed generally coaxial with axis 24.

Next the baffle 74 is inserted into the open upper end of the container to fit onto the inlet end 208 of tube 202 (step 316). Once again the baffle does not obstruct the inlet end of the tube but rather serves to shed downwardly refrigerant which enters the container via the inlet fitting so that the refrigerant will pass through the desiccant element.

The open end of the container is next closed by chucking the assembly in a suitable manner on the spindle of a spinning machine and friction spinning the open end of the tube stock to form the other closed end wall 74 (step 318).

Figure 11:
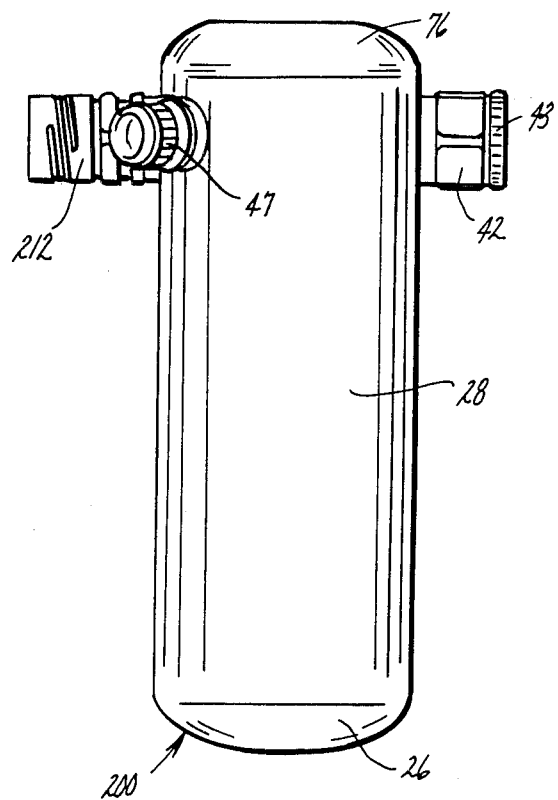
FIG. 11 is a longitudinal view of the exterior of the version of FIG. 10 upon completion.
Figure 12:
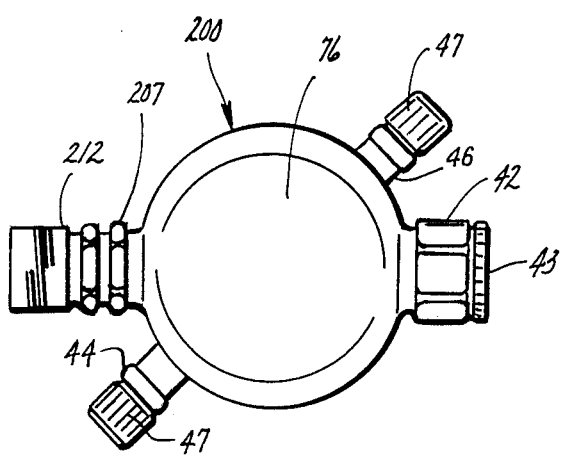
FIG. 12 is a top plan view of FIG. 11.
Figure 13:
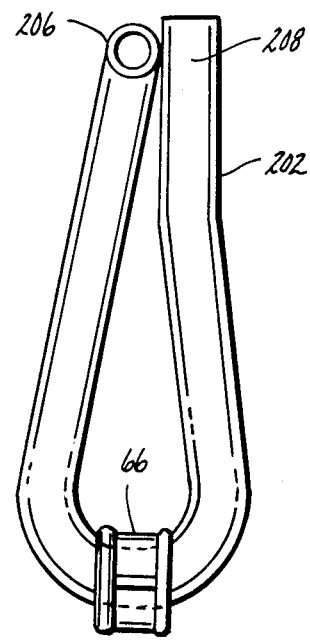
FIG. 13 is a longitudinal view of certain of the component parts of the second version shown apart from the assembly.

The completed assembly 200, is shown in FIGS. 11 and 12, including the additional steps, after the formation of end wall 76, of the insertion of valves (not shown) into the fittings 44 and 46 and the placement of protective caps 43, 47, 60 onto the fittings for subsequent removal when the desiccant assembly is installed for its intended use in a refrigerant circuit.

The internal tube version has the same advantages as the external tube version in that the container body is of a one piece unitary construction. Hence it too is a cost effective improvement over the prior procedures for making this general type of product.

Figure 14:
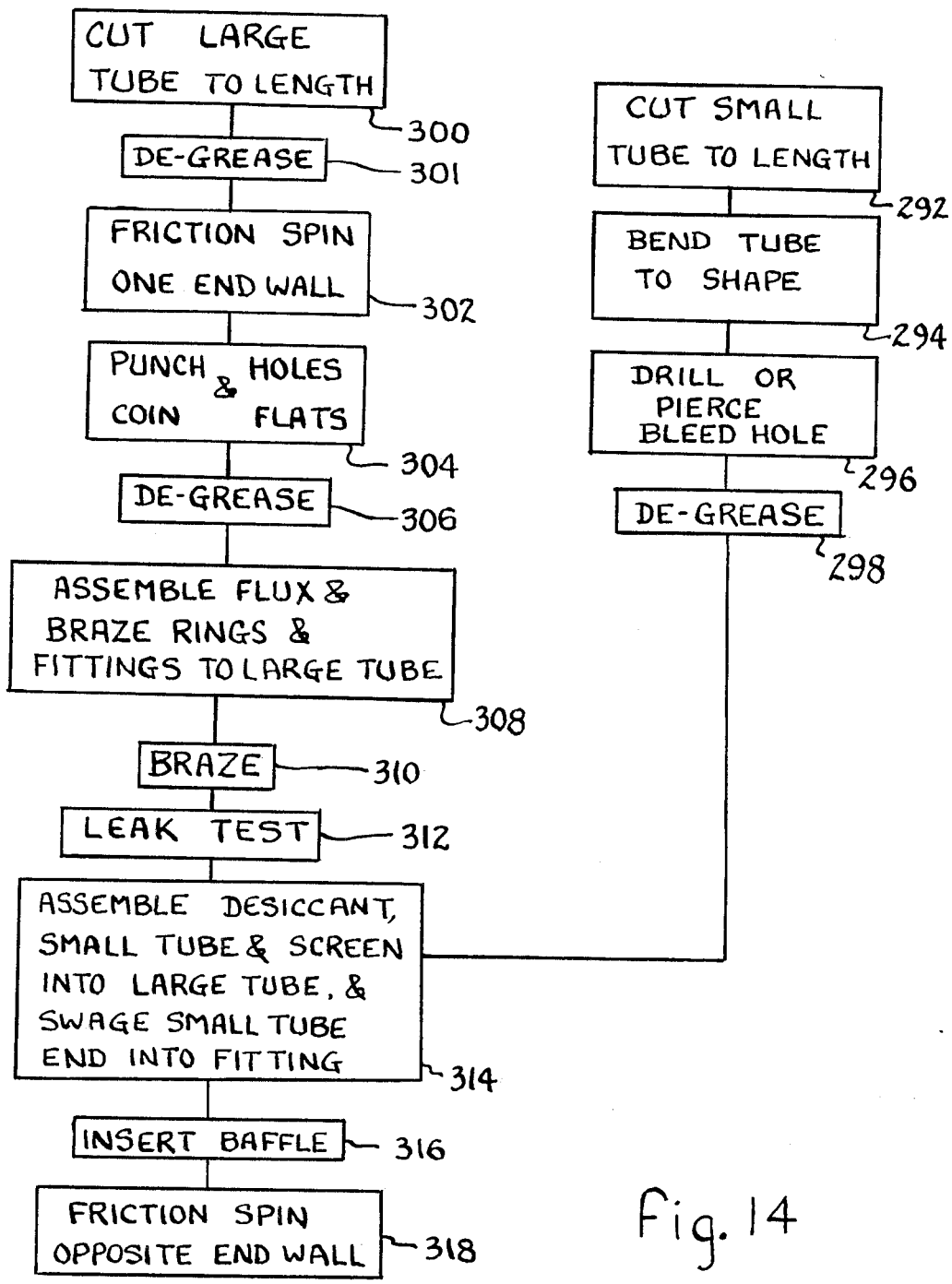
FIG. 14 is a block diagram useful in explaining a preferred sequence of fabrication steps for the version of FIGS. 10-13.

Although the drawing Figures have disclosed representative embodiments and the block diagrams of FIGS. 9 and 14 have portrayed representative steps, it is to be appreciated that these are merely exemplary of principles of the invention and that various other modes of practicing the invention are contemplated.

What is claimed is:

1. A method of making a desiccant assembly which is adapted to be connected into a refrigeration circuit, said method comprising the steps of; preforming a container body by cutting to length a piece of seamless tube stock, friction spinning one end of the tube stock to form a first end wall integral with a side wall, and forming apertures in said container body to provide for an inlet to and an outlet from the interior of the container body wherein at least one of said apertures is formed within said sidewall, assembling to the container body, at said apertures, inlet and outlet structures via which the desiccant assembly is adapted to be connected in the refrigeration circuit, said structures including a tube passing through one of said apertures so that a portion of the tube is disposed on the interior of the container body, and a portion on the exterior of the container body, said assembling step including joining said structures to the container body in a sealed manner around each aperture, said assembling step also including the step of inserting desiccant into the interior of the container body, and then after said assembling step, the step of friction spinning the opposite end of the tube stock to form a second end wall opposite the first end wall and wherein the steps of friction spinning the ends of the tube stock to form the end walls forms at least one of said ends so that the resulting end wall is fully closed.

2. The method set forth in claim 1 in which the step of forming apertures in said container body comprises forming one of said apertures in the first end wall.

3. The method set forth in claim 2 in which one of said apertures formed in said first end wall is formed concentric with the axis of the tube stock.

4. The method set forth in claim 1 in which the tube is initially straight and said assembling step comprises passing it through one of said apertures.

5. The method set forth in claim 1 further comprising the step of bending the exterior portion of the tube into a desired geometrical configuration and attaching a connectring fitting in an operative relationship on the exterior end of the tube.

6. The method set forth in claim 4 in which the step of friction spinning the opposite end of the tube stock to form the second end wall is conducted while said tube remains straight.

7. The method set forth in claim 1 in which the assembling step includes the step of placing a baffle onto the interior end of said tube after said tube has been assembled to the container body but before the opposite end of the tube stock has been friction spun to form the second end wall.

8. The method set forth in claim 1 in which the step of forming apertures in said container body to form an inlet to and an outlet from the interior of the container body includes the step of forming a third aperture, and said assembling step further includes the step of assembling to said third aperture a valve fitting adapted to receive a valve assembly and the further step of inserting a valve assembly into the valve fitting.

9. The method set forth in claim 1 in which the tube is assembled to the container body after the step of forming the first end wall but before the step of forming the second end wall, the tube being assembled via the opposite end of said seamless tube stock before the formation of the second end wall.

10. The method set forth in claim 9 in which the step of forming apertures in said container body to provide for an inlet to and an outlet from the interior of the container body comprises forming one of said apertures in the sidewall adjacent the opposite end of the tube stock, and the step of assembling the tube to the container body comprises manipulating the tube so as to cause the exterior portion of the tube to be passed through the aperture adjacent said opposite end.

11. The method set forth in claim 10 including the subsequent step of assembling to the exterior portion of the tube a connecting fitting.

12. The method set forth in claim 10 in which the step of forming the first end wall comprises forming the first end wall to be fully closed.

* * * * *